（12）United States Patent
Yoshioka et al.

(10) Patent No.: US 7,356,479 B2
(45) Date of Patent: Apr. 8, 2008

(54) DEVICE AND METHOD FOR ACCOMMODATING BUSINESS PROCESS

(75) Inventors: Takeshi Yoshioka, Nakai-machi (JP); Kazuto Hayashi, Nakai-machi (JP); Manabu Ueda, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1254 days.

(21) Appl. No.: 10/096,949

(22) Filed: Mar. 14, 2002

(65) Prior Publication Data

US 2003/0078823 A1 Apr. 24, 2003

(30) Foreign Application Priority Data

Oct. 18, 2001 (JP) .............................. 2001-320480

(51) Int. Cl.
*G06F 9/44* (2006.01)

(52) U.S. Cl. .............................................. 705/7; 705/8

(58) Field of Classification Search ................. 705/7–8
See application file for complete search history.

(56) References Cited

U.S. PATENT DOCUMENTS

| 5,819,270 | A | 10/1998 | Malone et al. |
| 6,968,533 | B1 * | 11/2005 | Ueda et al. ................. 717/100 |
| 7,076,727 | B1 * | 7/2006 | Flam et al. .................. 715/500 |

FOREIGN PATENT DOCUMENTS

| JP | A 11-85880 | 3/1999 |
| JP | A 2000-148829 | 5/2000 |
| JP | A 2001-14389 | 1/2001 |

OTHER PUBLICATIONS

Hollingsworth "Workflow Management Coalition The Workflow Reference Model) discloses the concept of a business process model comprising a post-activity", Jan. 1995, The Workflow Management Coalition, pp. 1-77.*
Malone et al., "Tools for inventing organizations: Toward a handbook of organizational processes", Management Science, 45 (3) pp. 425-443, Mar. 1999.
Crowston et al., MIT CCS Working paper #204, Jul. 1998.

* cited by examiner

*Primary Examiner*—Romain Jeanty
(74) *Attorney, Agent, or Firm*—Oliff & Berridge, PLC

(57) ABSTRACT

A process in which participants in different situations define in plural epistemological spaces can be easily accommodated. An epistemological space synthesizing part synthesizes different epistemological spaces to generate a new epistemological space, thereby juxtaposing therein business processes defined in each of the epistemological spaces. An accommodated activity extraction part extracts a combinable activity from the activities of the combined business process. A common resource extraction part extracts a combinable resource (common resource) used or produced by the extracted activity. A pre- and post-activity extraction part extracts pre- and post-activities to be accommodated. A combined business process generation part generates a business process which automatically synthesizes combinable parts from the juxtaposed business processes. An accommodating activity extraction selection part uses information acquired by the accommodation information extraction part to present an accommodating method. A user selects a suitable accommodating activity.

11 Claims, 20 Drawing Sheets

FIG. 5

| ID | EPISTEMOLOGICAL SPACE NAME | CHILD EPISTEMO-LOGICAL SPACE ID LIST | EPISTEMO-LOGICAL SPACE PARTS LIST | ACTIVITY ID LIST | RESOURCE ID LIST | CONNECTION RELATION ID LIST |
|---|---|---|---|---|---|---|
| C1 | GLOBAL EPISTEMO-LOGICAL SPACE | {C2, ...} | { } | {A1, ...} | {R1, ...} | {B1, ...} |
| C2 | TECHNOLOGY DEVELOPMENT | {C3, C0} | { } | {A10, ...} | {R10, ...} | {...} |
| C3 | NEW TECHNOLOGY DEVELOPMENT | { } | { } | {A20, ...} | {R20, ...} | {...} |
| C4 | NEW TECHNOLOGY DEVELOPMENT + COPIER DESIGN | { } | {C3, C5} | {...} | {...} | {...} |

FIG. 13

| ID | ACTIVITY NAME | PARENT ACTIVITY ID LIST | CHILD ACTIVITY LIST | WHOLE-PARTS CONNECTION RELATION ID LIST |
|---|---|---|---|---|
| A1 | ROOT ACTIVITY | { } | {...} | { } |
| A2 | RESEARCH | {A1} | {...} | {, B3, B10, ....} |
| A3 | ACCOMMODATING ACTIVITY | {A1} | {...} | { } |
| A4 | RESOURCE FIT ACCOMMODATION | {A3} | {...} | { } |

※NOTE: A RESOURCE IN WHICH AN EPISTEMOLOGICAL SPACE IS NOT SPECIFIED BELONGS TO A GLOBAL EPISTEMOLOGICAL SPACE

RESOURCE FIT DEPENDENCY

RESOURCE SHARING DEPENDENCY

FIG. 17

| ID | RESOURCE NAME | PARENT RESOURCE ID LIST | CHILD RESOURCE LIST | PARTS RESOURCE ID LIST |
|---|---|---|---|---|
| R1 | ROOT RESOURCE | {} | {...} | {} |
| R2 | NEEDS | {A1} | {...} | {R5, R7} |

FIG. 18

| ID | DEPENDENCY NAME | CHILD DEPENDENCE RELATION LIST |
|---|---|---|
| D1 | BASIC DEPENDENCY | {D2, ...} |
| D2 | RESOURCE SHARING DEPENDENCY | {A1} |

FIG. 19

| ID | DEPENDENCY ID | FORWARD ACTIVITY OR RESOURCE ID LIST | BACKWARD ACTIVITY OR RESOURCE ID LIST | ACCOMMODATING ACTIVITY ID |
|---|---|---|---|---|
| B1 | D1 | {...} | {} | A100 |
| B2 | D2 | {...} | {R5, R7} | NONE |

FIG. 20
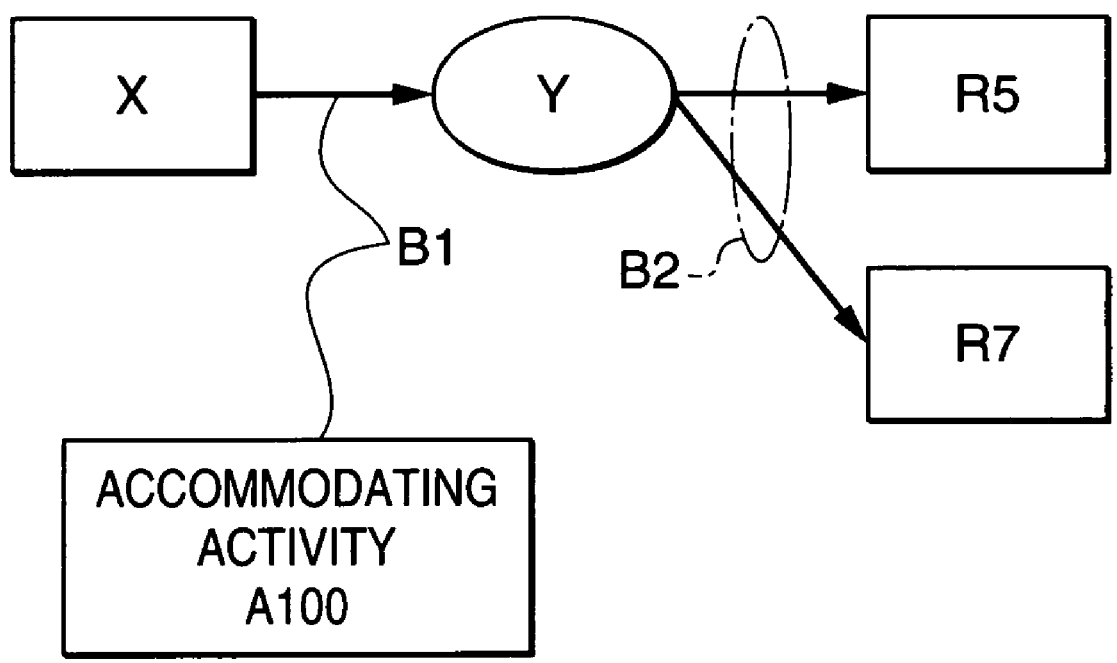
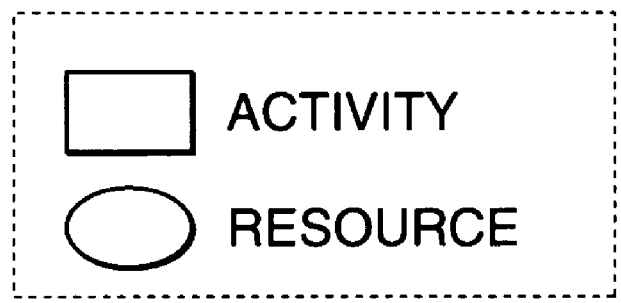

DEVICE AND METHOD FOR ACCOMMODATING BUSINESS PROCESS

BACKGROUND OF THE INVENTION

1. Field of the Invention

The present invention relates to a process accommodating technique for assisting business process improvement and reform.

2. Description of the Related Art

Information technology (IT) has been evolved and there has recently been a growing number of companies and organizations which introduce a workflow management system and ERP (Enterprise Resource Package) using IT to improve and reform a business process (hereinafter, referred to as process). In this case, the existing process must be accommodated in a form usable in the workflow management system and ERP. Furthermore, knowledge is a resource for companies and many companies are introducing knowledge management. As part of the knowledge management, a process knowledge repository is being structured, and process knowledge such as stored best practice applicable to the current business is searched, to be accommodated for process improvement and reform.

For process reform and improvement, the business process of a target organization is modeled. Then, based on the process model, an improvement and reform point is extracted, and an improvement and reform plan is generated, which is then actually implemented and evaluated.

There have been many systems for assisting workflow accommodation, that is, workflow design assistance systems in which business process is modeled by the flow of activities with input resource and output resource in the current business to make the order and flow of the activity efficient therein.

For example, Japanese Published Unexamined Patent Application No. 2000-148829 proposes that for business processes, a database has business process patterns corresponding to product design process, general management business process and general work process of the office personnel associated with input parameters. When designing a workflow, a suitable business process pattern is decided from the business process patterns based on the input parameter information.

Similarly, Japanese Published Unexamined Patent Application No. 2001-14389 proposes that a server stores a business process pattern including an activity set, control, application and actor as a repository file, and the pattern can be copied from a client terminal when designing a workflow.

Japanese Published Unexamined Patent Application No. Hei 11-85880 proposes that a previously analyzed business process is divided into a stable part and a changeable part, and that based on the stable part, a process pattern including request, executing condition accommodation, executing result notification and executing result evaluation is extracted using the pattern based on the related business form used. The process pattern and the pattern constitute a design pattern. Based on the design pattern, a customer's business process is examined to decide a workflow design specification, and an electronic business form is created based on the examination of the data.

The workflow design assistance system mainly targets process improvement by digitizing business forms. For process reform and improvement, as in the soft systems methodology originally proposed by Checkland, it is important that a target organization for process improvement is assumed that a human activity system is considered as a business-related social context. In this case, as is advocated in the soft systems methodology, it is important that core business processes are modeled from the participants views or recognitions based on plural epistemological space, and plural business processes are accommodated in consideration of the social context in order to create an business process plan for implementation. In the soft systems methodology, coordination among plural business processes defined in each epistemological space is called accommodation. Accommodation is performed through the discussion of the participants in order to decide an implementation process, and then implement the process in an organization as the new business process.

In the soft systems methodology, a process knowledge for accommodation is not supported by a concrete method or a software system. A coordination theory for assisting process accommodation and a system based on the theory do exist, but it cannot be applied easily for the accommodation because of the coordination theory does not take into account of participants' recognitions and views explicitly In Process Handbook developed by Center for Coordination Science at MIT, based on the method proposed in U.S. Pat. No. 5,819,270, a node for representing dependency between activities is introduced, and a relation between activities is represented via the node as a network diagram. Process Handbook classifies the dependency between activities into three types of resource flow, fit and sharing, and builds the coordination knowledge taxonomy (classification structure) focusing on resource flow. Process Handbook also implements a method in which when accommodating processes, a dependency to be accommodated or managed is searched and plans how to manage the dependency are illustrated. (Reference, MALONE, T. W. et al. 1999. Tools for inventing organizations: Toward a handbook of organizational process. Management Science, 45, 425-443)

Crowston and Osborn (reference, MIT CCS Working paper wp#204) introduce detailed accommodation knowledge such as bidding related to the resource flow, fit and sharing in consideration of an activity executor, and production and consumption order of the resource flow.

The related art mainly targets process improvement focusing on digitizing business form used in a workflow. The related art does not consider a viewpoint of business-related plural organizations and personal object, and to accommodate the viewpoint to reform a business process. For this reason, it is difficult to consider a social context included in the business and to accommodate the viewpoint. Activities to be accommodated can be studied only after a workflow is described in detail.

In the soft systems methodology (hereinafter, referred to as SSM) developed by Checkland et al., a participant's viewpoint is a view of the world (business knowledge viewed from the role of a business process participant), a business process is assumed to be a related system based on a worldview, and the related system is accommodated to explore an executable process. The process reform is thus performed. Coordination between business processes having different viewpoints (coordination between related systems in which SSM calls accommodation) employs a personal method in which business processes are compared using a diagram, and are then discussed between participants to decide an execution plan. For this reason, there is no methodology in which a process reform is assumed to accommodate business processes reflecting plural viewpoints to a possible executable process, the accommodation is systematically assisted using accommodation knowledge stored on a computer and the previous accommodation case, a problem of which a business process planner is unaware of is pointed out, and executable process creation is assisted in consideration of a social context. Therefore it has been a problem that accommodation based upon personal experiences and knowledge is made and the created process executability cannot be ensured. It is also difficult to transfer the previous accommodation knowledge.

It can be considered that using the soft systems methodology, for accommodation, accommodation knowledge from the Coordination theory as the studying result of Malone and Crowston et al. is partially used. The use is limited because there is no methodology for combining plural processes and a viewpoint of a resource is essential for activity accommodation. There is no storage system for storing a process reform process (metaprocess) from process definition to accommodation, execution and evaluation. To learn knowledge related to a process reform, it is necessary to actually take part in a process reform and to receive OJT, thereby learning the knowledge. For this reason, it is difficult to transfer the accommodation knowledge in the previous process improvement and reform.

SUMMARY OF THE INVENTION

The present invention has been made in view of the above problems and provides a method (methodology) in which the viewpoint of a business process participant is represented as epistemological space the participant's recognition field (hereafter, referred to as epistemological space), accommodation of plural business processes having different epistemological space epistemological space is assisted by accommodation knowledge stored on a computer, and executable process creation is assisted in consideration of a social context.

The present invention also facilitates knowledge transfer and management related to process reform and improvement from process definition to accommodation, execution and evaluation.

To achieve the foregoing, the present invention employs the structure as described in claims. The described contents in claims will be additionally described here.

According to one aspect of the present invention, to achieve the foregoing, a business process accommodating device which accommodates plural business processes respectively defined so that plural activities have a dependency through resources, is provided with: a storage unit that stores epistemological spaces for business processes; a definition unit that defines in each of the epistemological space for each of the business processes to be accommodated; an epistemological space synthesizing unit that synthesizes the epistemological spaces; an accommodated activity extraction unit that extracts in the synthesized epistemological space in which a combinable activity from activities defined in the business process to be accommodated; a common resource extraction unit that extracts a combinable resource in the business process to be accommodated; a pre- and post-activity extraction unit that extracts activities executed before and after the extraction activity of each of the business processes; a combined business process generation unit that combines the business processes to be accommodated; and an accommodating activity extraction selection unit that extracts an accommodating activity part from the combined business process.

The accommodating activity part is decided in a range of a combinable activity and activities before and after that based on a combinable activity and a combinable resource.

In this structure, multiple epistemological space is synthesized, and a combinable activity in a business process arranged in the synthesized epistemological space is extracted to combine the business processes. When resources of the combinable activities are common, accommodation knowledge related to its dependency is used to accommodate the combined business process.

The foregoing aspects of the present invention and other aspects of the present invention are described in claims and will be explained below in detail using embodiments.

The present invention can be not only realized as a device or system but also implemented as a method embodiment, and at least part of it can be structured as a computer program.

BRIEF DESCRIPTION OF THE DRAWINGS

Preferred embodiments of the present invention will be described in detail based on the followings, wherein:

FIG. 5 is a diagram of assistance in explaining an example of data structures of accommodation knowledge between epistemological spaces according to the embodiment;

FIG. 13 is a diagram of assistance in explaining an activity data structure example according to the embodiment;

FIG. 17 is a diagram of assistance in explaining a resource data structure example according to the embodiment;

FIG. 18 is a diagram of assistance in explaining a dependency data structure example according to the embodiment;

FIG. 19 is a diagram of assistance in explaining a connection relation data structure example according to the embodiment; and FIG. 20 is a diagram of assistance in explaining an example of a connection relation according to the embodiment.

DETAILED DESCRIPTION OF THE PREFERRED EMBODIMENTS

The present invention will be described below in detail based on the drawings.

Figure 1:
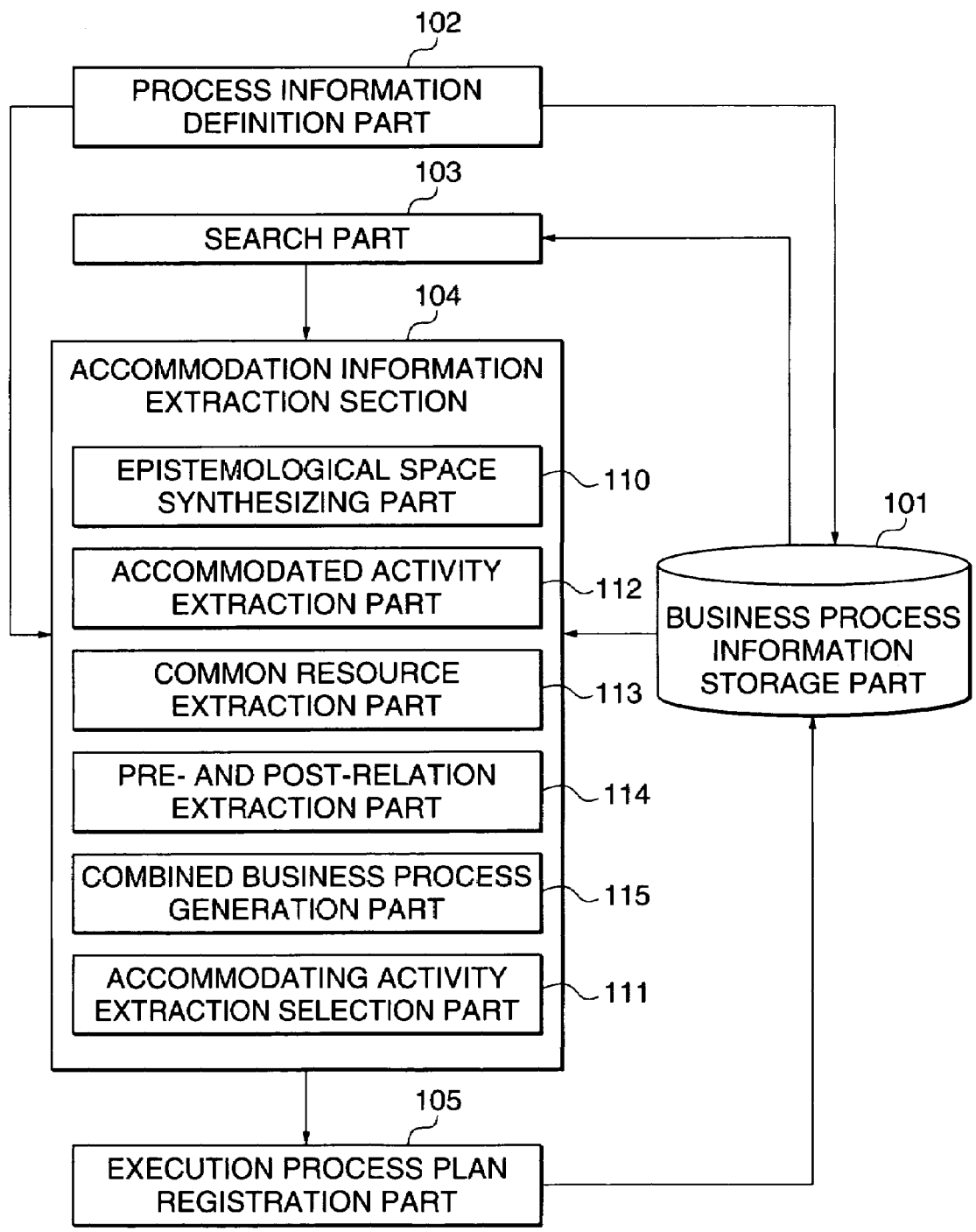
FIG. 1 is a diagram showing the structure of a business process accommodating device of an embodiment of the present invention.

FIG. 1 is a diagram showing one example of the structure of a business process accommodating device of one embodiment of the present invention. In FIG. 1, a business process managing device 10 includes a business process information storage part 101, a process definition part 102, a search part 103, an accommodation information extraction section 104, and an execution process plan registration part 105. The accommodation information extraction section 104 includes an epistemological space synthesizing part 110, an accommodating activity extraction selection part 111, an accommodated activity extraction part 112, a common resource extraction part 113, a pre- and post-activity extraction part 114, and a combined business process generation part 115.

The business process information storage part 101 stores epistemological space information and information related to various business processes in the epistemological space in a file or database form. Various business processes are defined by a combination of activities or a combination of an activity and a resource using the process definition part 102.

Figure 4:
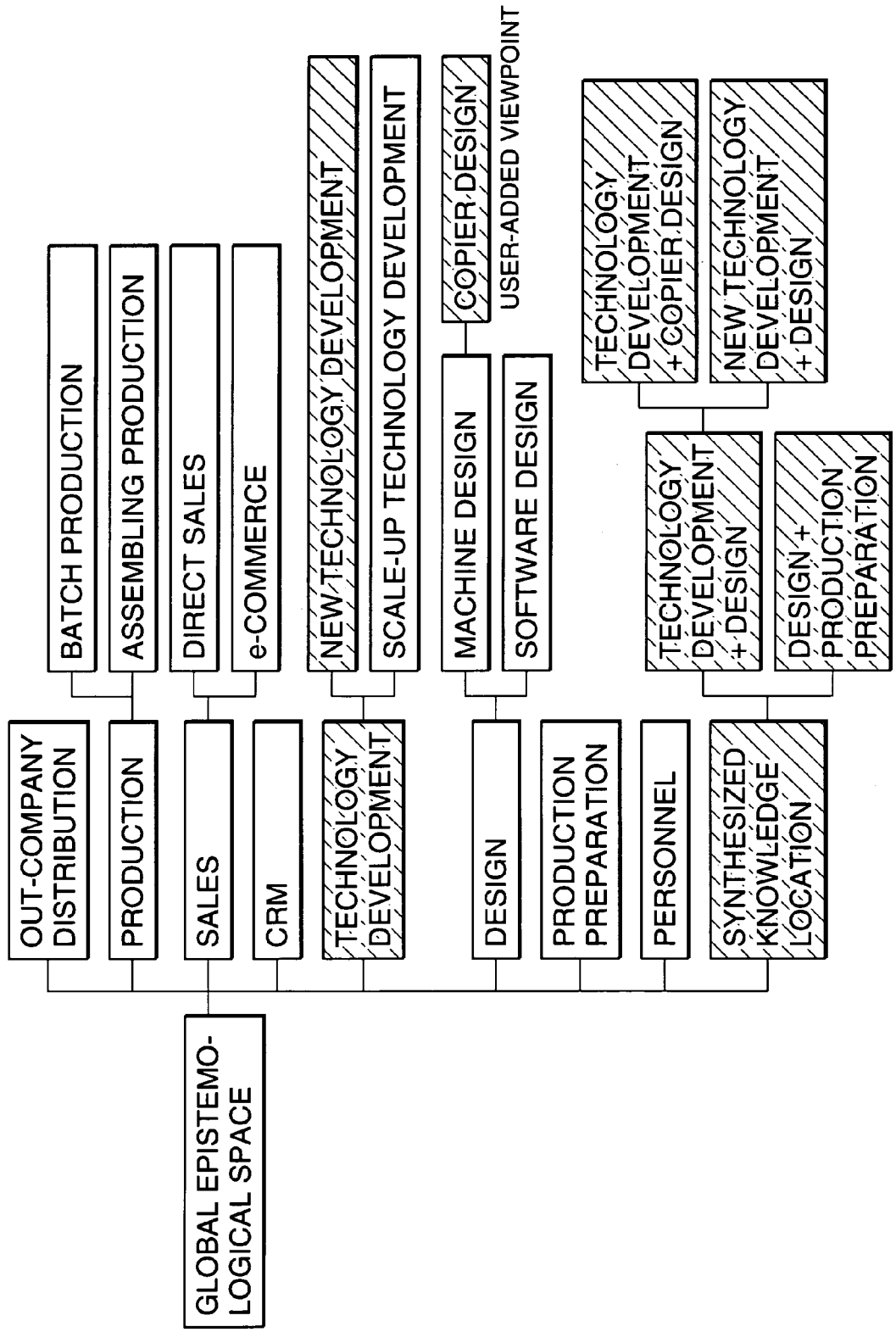
FIG. 4 is a diagram of assistance in explaining an example of an epistemological space abstract-concrete relation according to the embodiment.

As shown in FIG. 4, with respect to the epistemological space, there is a root epistemological space which is at the core, which has an abstract-concrete relation with all epistemological spaces. In other words, logically, a tree structure is provided so that an epistemological space abstract-concrete relation can be represented.

Figure 10A:
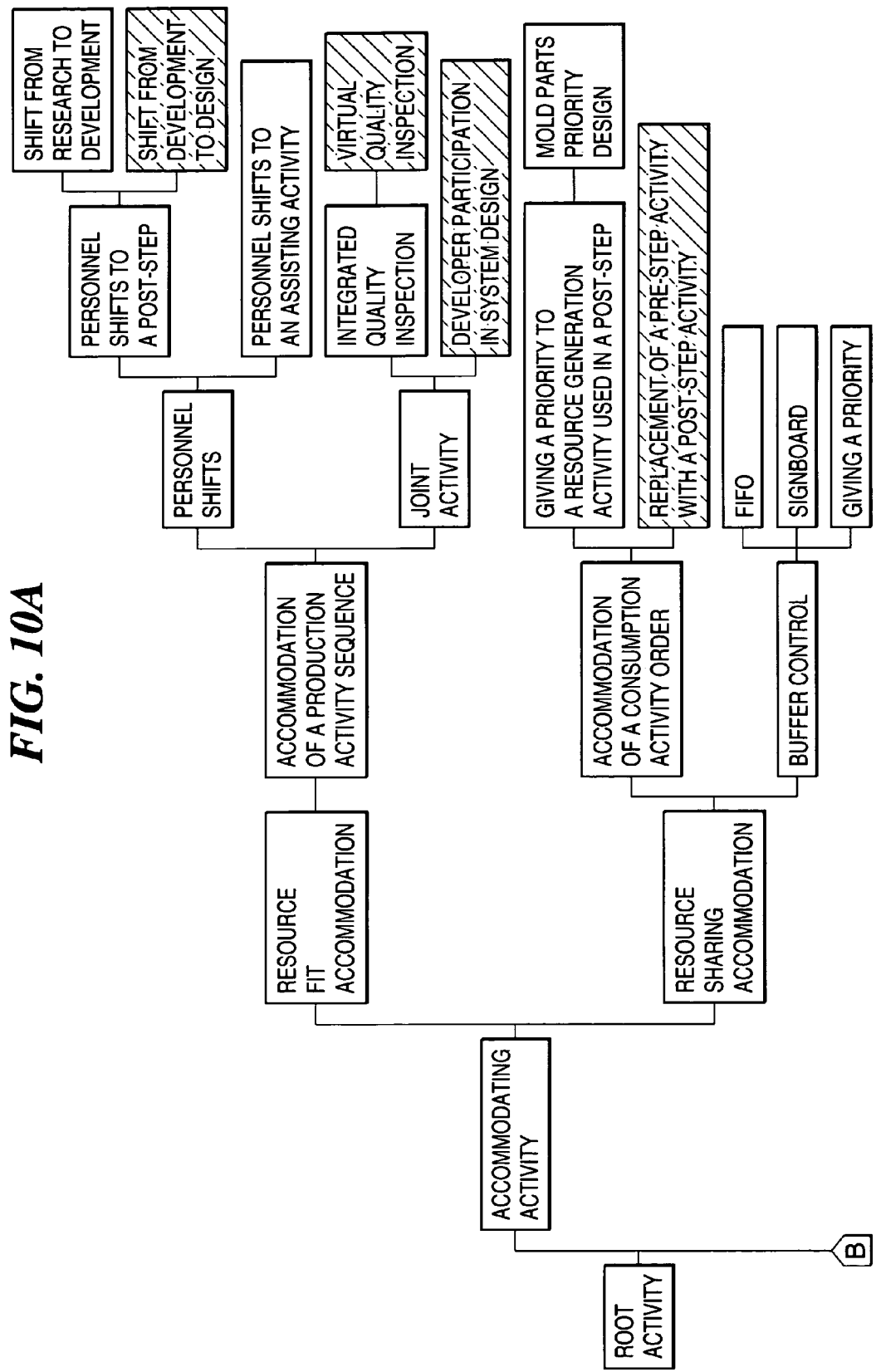
FIG. 10 is a diagram of assistance in explaining an example of an activity abstract-concrete relation according to the embodiment.
Figure 10B:
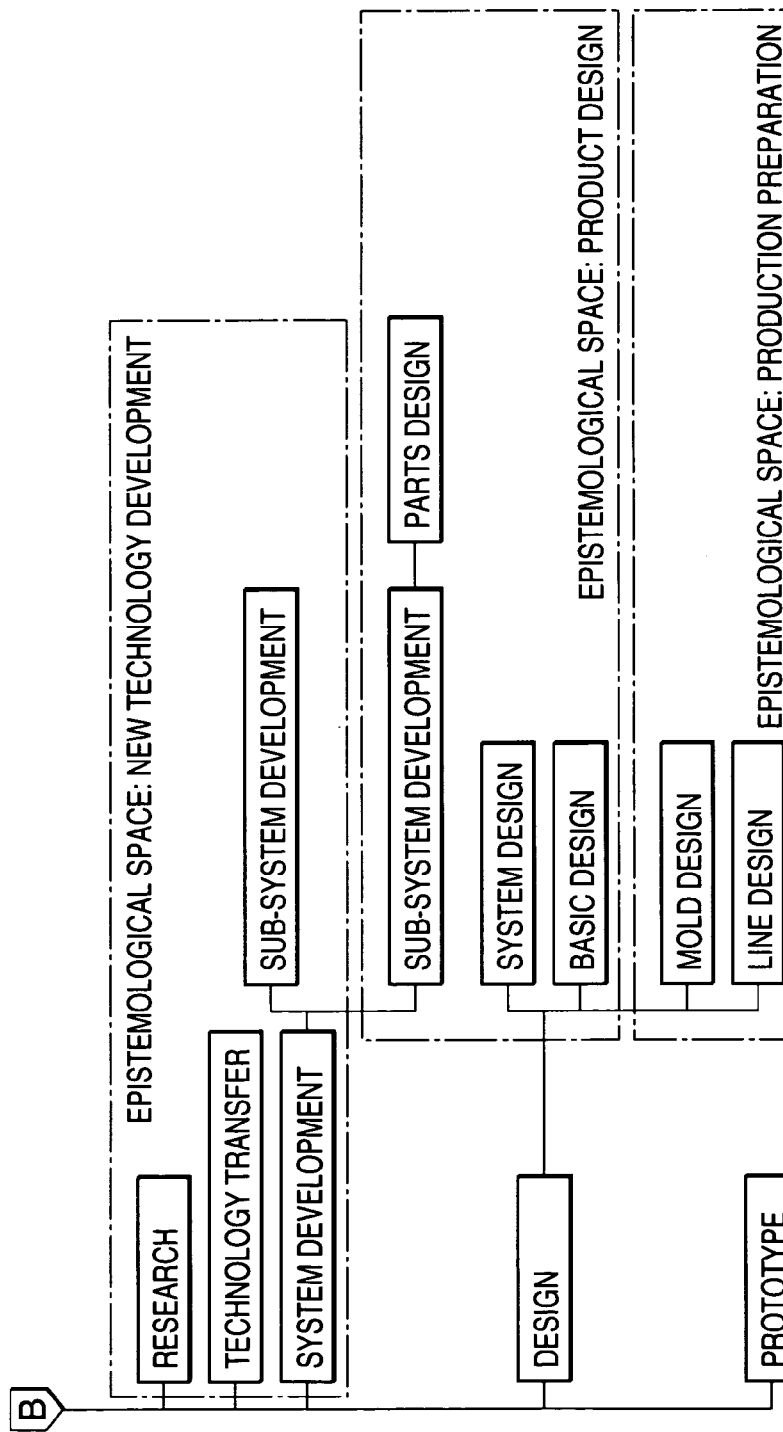
Figure 14:
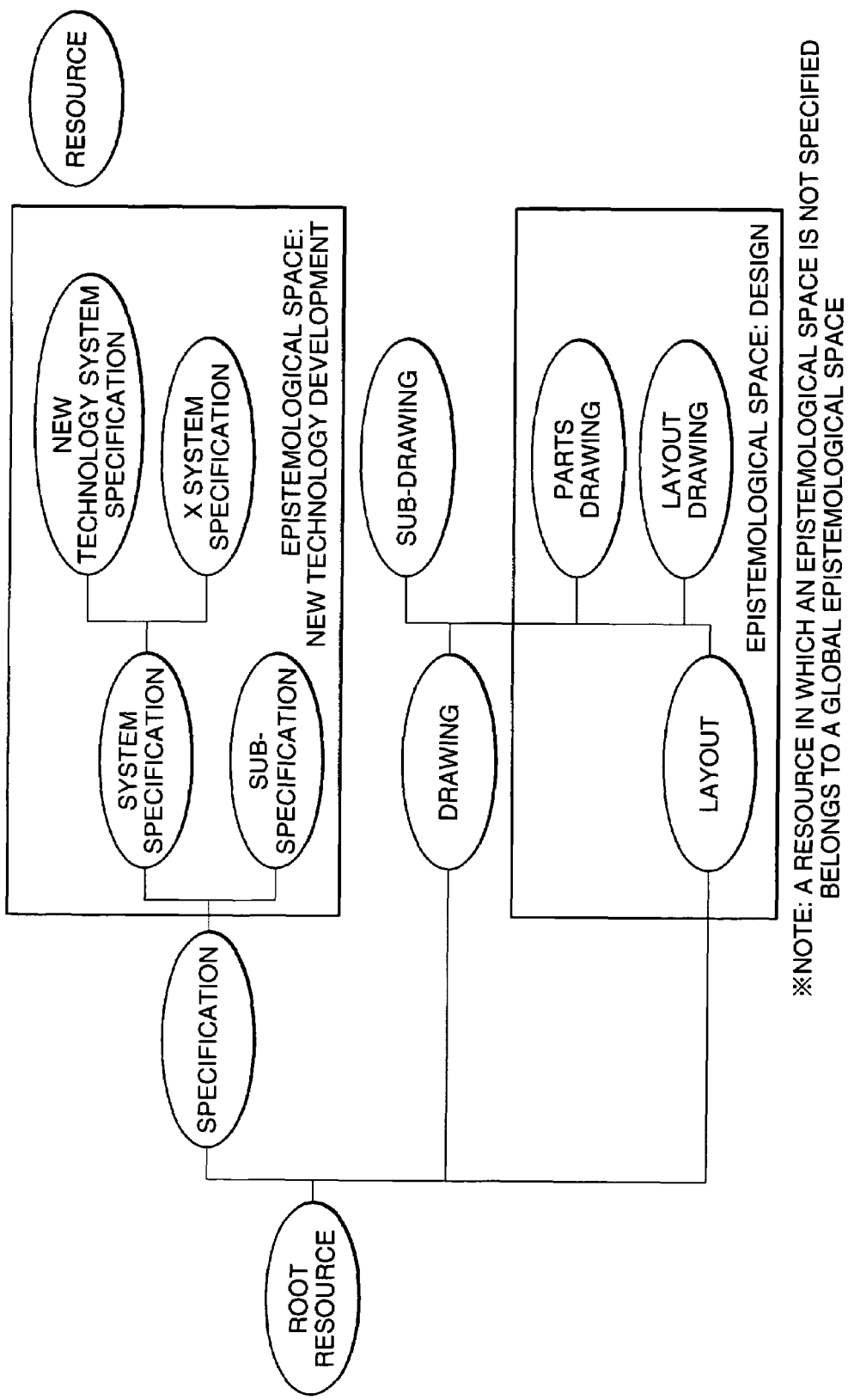
FIG. 14 is a diagram of assistance in explaining an example of a resource abstract-concrete relation according to the embodiment.
Figure 15A:
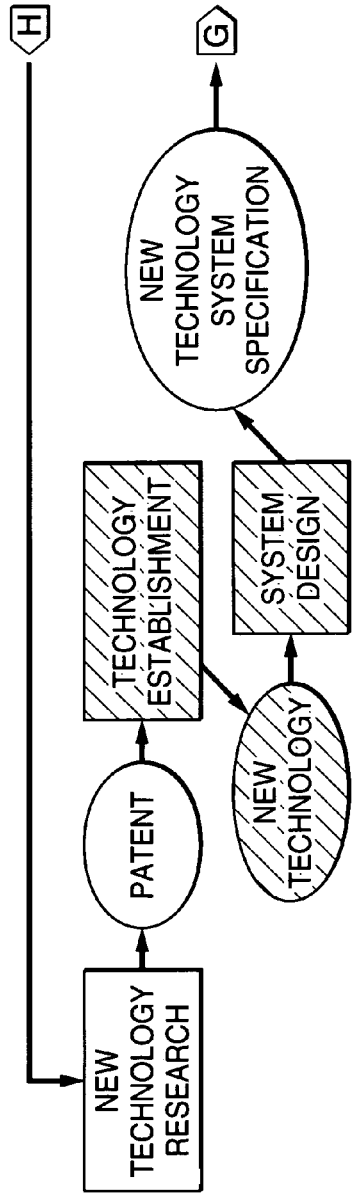
FIG. 15 is a diagram of assistance in explaining an example of an executable business process plan after accommodating synthesized epistemological space "new technology development+copier design" according to the embodiment.
Figure 15B:
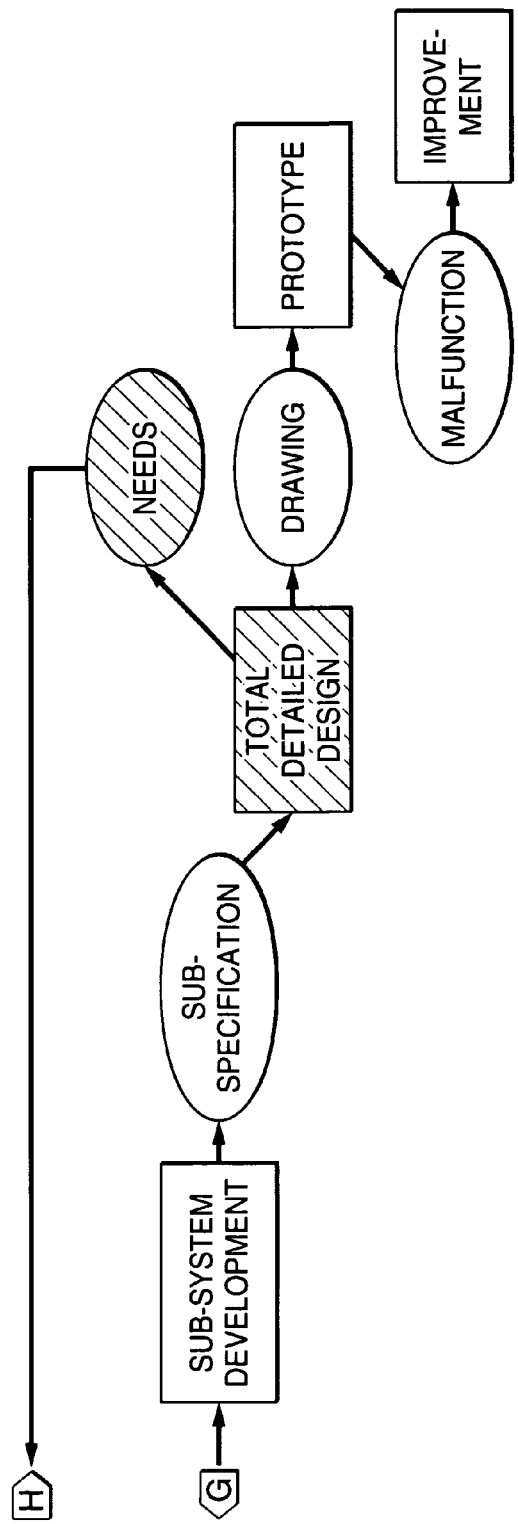

As shown in FIGS. 14 and 10, in the root epistemological space, the following are defined: a root activity as an abstract activity of all activities, a root resource as an abstract resource of all resources, and a basic dependency as an abstract dependency of all the activity and resource relations. Like the epistemological space, all of the activities, resources and dependencies can be represented by a tree structure. The data structure representing the relation is shown in FIG. 5 for the epistemological space; in FIG. 13 for the activity; in FIG. 17 for the resource; and in FIG. 18 for the dependency. In FIG. 10, an activity in which the epistemological space is not specified belongs to the root epistemological space (hereafter as referred to global epistemological space).

The business process information storage part 101 represents a registered epistemological space, activity, resource, and connection relation as an activity-resource relation. It is possible to search an epistemological space using its abstract-concrete (is-a) relations or its whole-part (has-a) relations, an activity using its abstract-concrete (is-a) relations and its whole-part (has-a) relations, a resource using its abstract-concrete (is-a) relations and whole-part (has-a) relations, an activity and a resource belonging to each of epistemological spaces, and a resource-activity connection relation.

Figure 9:
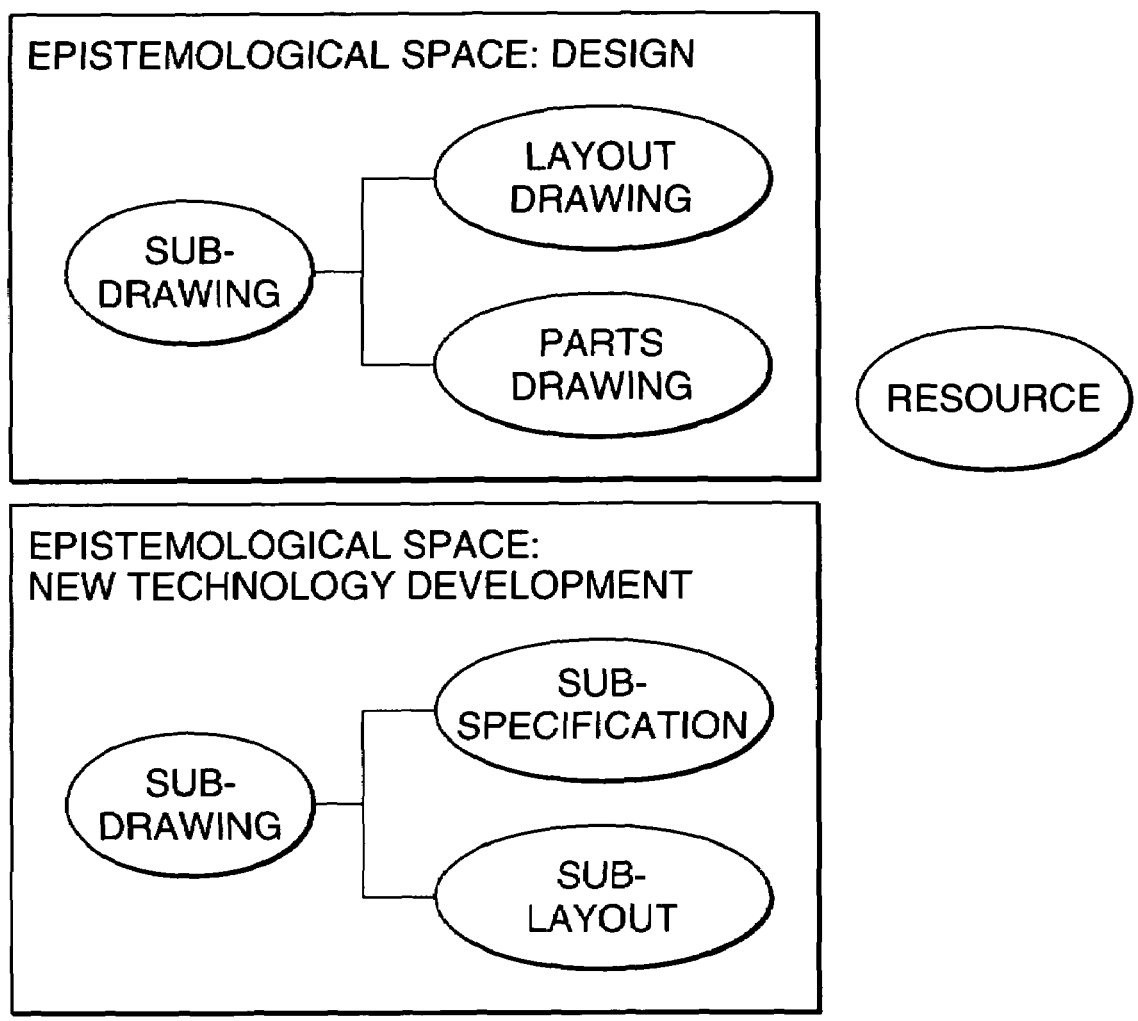
FIG. 9 is a diagram of assistance in explaining an example of a resource inclusion relation according to the embodiment.

FIG. 19 shows an example of the data structure of the connection relation. FIG. 20 shows an example of a connection relation described by such a data structure. FIG. 20 shows that there are a connection relation B1 between an activity X and a resource Y, and a connection relation B2 between the resource Y and activities R5 and R7. An accommodating activity A100 is defined corresponding to the connection relation B1. In FIG. 14, the resource "system specification", the resource "new technology system specification", the resource "X system specification" and the resource "sub-specification" belong to the epistemological space "new technology development"; the resource "drawing", the resource "layout", the resource "parts drawing" and the resource "layout drawing" belong to the epistemological space "design"; and other resources belong to a global epistemological space. The resource "sub-drawing" has an abstract resource which becomes plural parents. FIG. 9 represents an inclusion relation between some resources in the epistemological space "new technology development" and an inclusion relation between some resources in the epistemological space "design". The activity abstract-concrete (is-a) relation in FIG. 10 is similar to the above and is not described herein.

Since both an activity and a resource belong to an epistemological space, the same name can be used for representing different activities as in the activity "sub-system development" in FIG. 10. A typical process (business process pattern) can be represented in each of the epistemological spaces.

As described previously, the accommodation information extraction section 104 has the epistemological space synthesizing part 110, the accommodating activity extraction selection part 111, the accommodated activity extraction part 112, the common resource extraction part 113, the pre- and post-activity extraction part 114, and the combined business process generation part 115.

The accommodation information extraction section 104 uses one or more methods to extract accommodation information on plural business processes including different epistemological spaces. The epistemological space synthesizing part 110 synthesizes the different epistemological spaces to generate a new epistemological space, thereby juxtapose therein the business processes defined in each of the epistemological spaces. The accommodated activity extraction part 112 extracts a combinable activity from the activities of the combined business process to extract the activity as an accommodated activity. The common resource extraction part 113 extracts a combinable resource (common resource) by plural business processes used or produced by the accommodated activity. The pre- and post-activity extraction part 114 extracts pro- and post-activities to be accommodated. The combined business process generation part 115 generates a business process which automatically synthesizes combinable parts from the juxtaposed business processes.

The accommodating activity extraction selection part 111 uses information acquired by the accommodation information extraction section 104 to present an accommodating method, whereby the user selects a suitable accommodating activity. The user can use the accommodating activity selected here to create an execution business process plan, and use the execution process plan registration part 105 to store it into the business process information storage part 101.

An input unit and an output unit used in a computer are omitted here. The input unit inputs information using a mouse or keyboard, which is used for making various selections. The display unit displays information on a computer display, a cellular phone, a PDA, a printer and the like.

Figure 2:
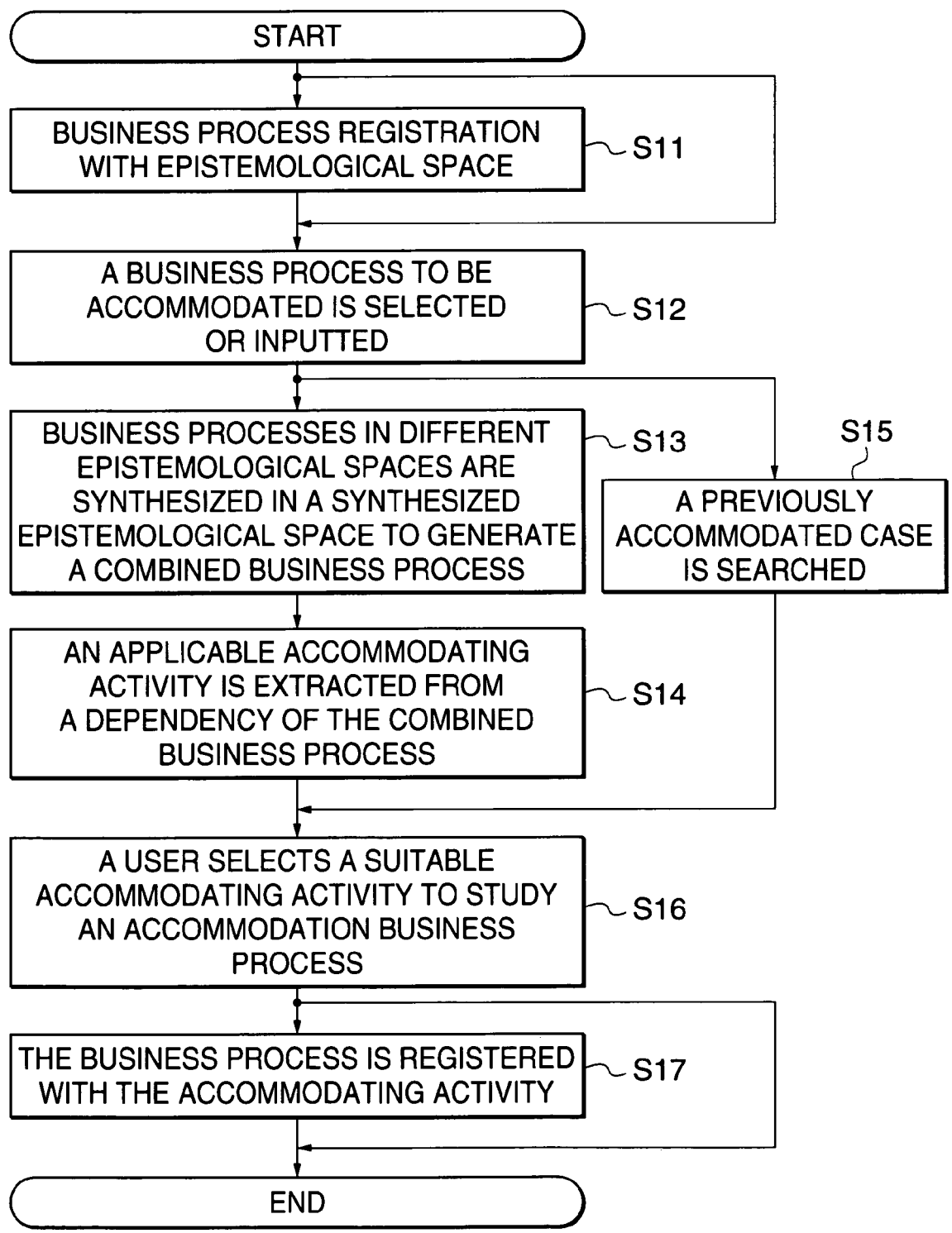
FIG. 2 is a flowchart showing an overview of the process of the embodiment.

FIG. 2 shows an overview of the entire flow of the present invention. The process definition part 102 is used to define a business process to be accommodated together with an epistemological space describing a process, which is then stored into the business process information storage part 101 (S11). In this case, after inputting or selecting only the epistemological space, a business process pattern (hereinafter, described as a business template) corresponding to an epistemological space name registered into the business process information storage part 101 is selected, and then, a business process may be defined using the process definition information as a model (S12). Similarly, after deciding the epistemological space of the business process, a business process case in the same epistemological space already registered into the business process information storage part 101 may be searched and reused.

With any one of the following methods, information on the business processes to be accommodated including different epistemological spaces is acquired (S13).

A first method is a method for defining only an epistemological space by the above-mentioned process defining method.

In a second method, a previously accommodated business process case between plural epistemological spaces registered into the business process information storage part 101 is used (which is already defined by the process definition part), and a similar business process is selected, whereby a business process having different epistemological spaces accommodated together with the business process is selected and reused. When reusing a previous case, the case may be used as it is, or the case may be modified and a business template as the base of the case may be selected and used.

A third method is a method in which accommodation knowledge is selected, a business process using the accommodation knowledge is extracted, and business process information similar to the business process is selected and used. When searching the similar business process information, the epistemological space abstract-concrete (is-a) relation may be used so that an epistemological space in the range of a direct parent, child and brother may be accommodated as an epistemological space having accommodable business process information. The range to search the business process in the epistemological space may be defined beforehand as a similar business process search rule, and then, a suitable one may be selected therefrom and used by the search part 103. The user may be allowed to assume the pre- and post-steps, and to use any one of the methods to define the business process, thereby setting an opportunity for accommodation between different epistemological spaces.

An accommodating activity applicable between plural business processes having different epistemological spaces is acquired by either of the following two methods using the accommodating activity extraction selection part 111 to select and decide a user's suitable one (S14, S15 and S16).

In a first method, the epistemological space synthesizing part 110 is used to generate a new epistemological space combining the epistemological spaces (synthesized epistemological space) to plural business processes having different epistemological spaces, and then, the business processes of each of the epistemological spaces are juxtaposed therein. From the juxtaposed business processes, the accommodated activity extraction part 112, the common resource extraction part 113, and the pre- and post-activity extraction part 114 are used to extract a combinable activity and resource and the respective activities used before and after that. Thereafter, the combined business process generation part 115 is used to synthesize the combinable parts to automatically generate a new business process (combined business process). The resource fit dependency and the resource branch dependency (that is, the dependency which branches before and after the common resource) in the combined business process are identified as the accommodation part. The accommodating activity applicable to the defined accommodation part is presented to the user from the accommodation knowledge taxonomy registered into the business process information storage part 101. When extracting the combinable activity and resource, the user may select a suitable one from the similar business process search rule defined in the business process information storage part 101 using the epistemological space, activity and resource abstract-concrete (is-a) relation and whole-part (has-a) relation.

A second method is a method for reusing accommodation knowledge previously used in the similar synthesized epistemological space. First, the user selects, as the component of the synthesized epistemological space, a synthesized epistemological space including both an epistemological space to which each of plural business processes to be accommodated belongs and a similar epistemological space. A previously used accommodation knowledge is searched to select a suitable one. Using the business process template, the search range may be limited to accommodation knowledge applied in certain activities or activities and resources. The similar business process search rule used in the first method may be used to limit the activity and research search range.

Finally, in the above methods, the business process in which the user accommodates plural business processes having different epistemological spaces is an execution business process plan. Then, the accommodation activity and the business process before accommodation are registered as accommodation information into the accommodation storage part (the business process information storage part 101) (S17).

Depending on the user's preference, the business process may be registered into the business process information storage part 101, or the business process may be edited to create a typical business pattern, which is added as the template to an accommodation storage activity.

With specific examples, the detailed description will be done below. An overview of the respective inventions explained in FIG. 2 will be described using an example of the product design of a certain company and an example of accommodation of a business process having epistemological spaces of technology development, product design and production preparation.

Figure 3:
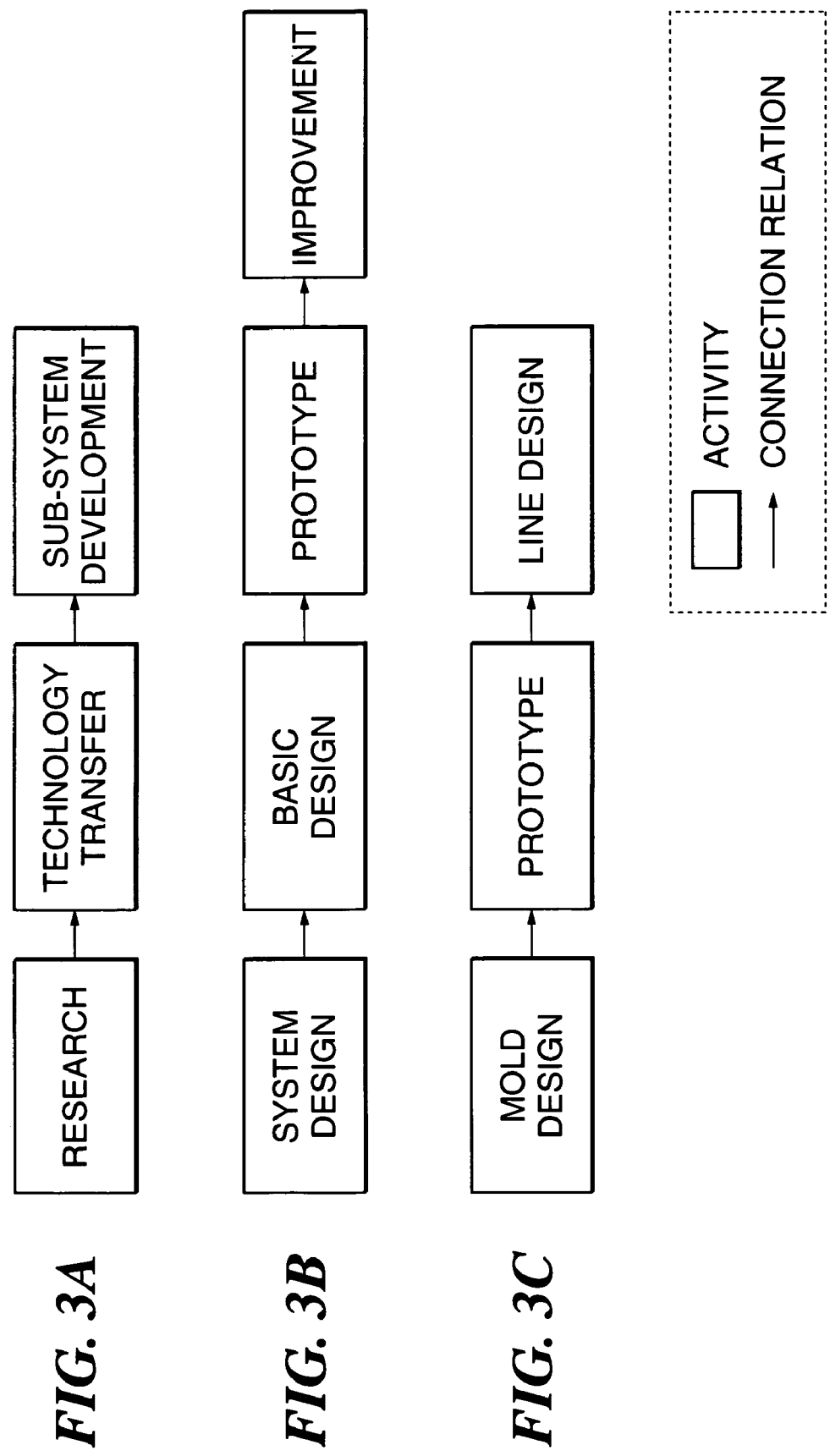
FIG. 3 is a diagram of assistance in explaining business process templates corresponding to epistemological space of new technology development, product design and production preparation according to the embodiment.

FIG. 3 is a business template which represents a typical business process corresponding to the respective epistemological spaces of "new technology development", "product designs" and "production preparation" stored into the business process information storage part 101.

FIG. 3A is typical activities of the epistemological space "new technology development" which stores three activities of "research", "technology transfer" and "sub-system development" in that order. Similarly, in FIG. 3B, typical activities of the epistemological space "design" having "system design", "basic design", "prototype" and "improvement" are stored. In FIG. 3C, typical activities of the epistemological space "production preparation" having "mold design", "prototype" and "line design" are stored.

FIG. 4 is an example of an user interface in which the user selects am abstract epistemological space and adds the new concrete epistemological space "copier design" as an epistemological space to be accommodated using the epistemological space abstract-concrete (is-a) relation defined in the business process information storage part 101. As shown in FIG. 4, the epistemological space abstract-concrete (is-a) relation is represented as a tree structure. The user can select the existing epistemological space and input a new epistemological space as the concrete epistemological space of the existing epistemological space. Here, the user newly adds the "copier design" as the concrete epistemological space of "machine design."

A method is described hereinafter in which the accommodation information extraction section 104 is used to acquire an accommodating activity which accommodates a business process defined in different epistemological spaces.

A first method is a method in which the epistemological space synthesizing part 110 is used to generate a new epistemological space (synthesized epistemological space) combining the epistemological spaces to plural business processes having different epistemological spaces; a combined business process combining the business processes to be accommodated is automatically generated therein; a connection relation is extracted from the combined business process; the type of the dependency of the connection relation is acquired; and accommodation knowledge applicable to the acquired dependency is acquired from the business process information storage part 101.

Figure 11A:
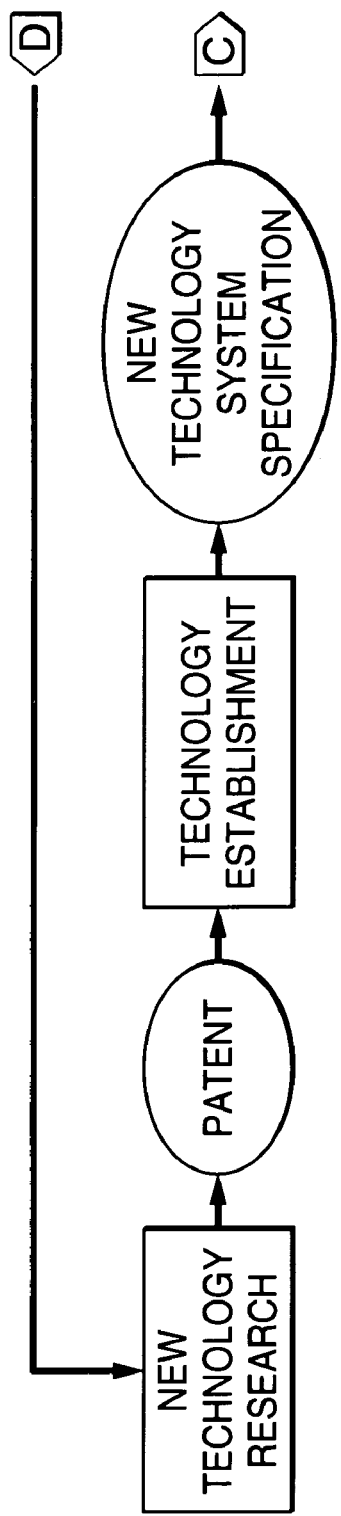
FIG. 11 is a diagram of assistance in explaining an example of a business process of epistemological space "new technology development" according to the embodiment.
Figure 11B:
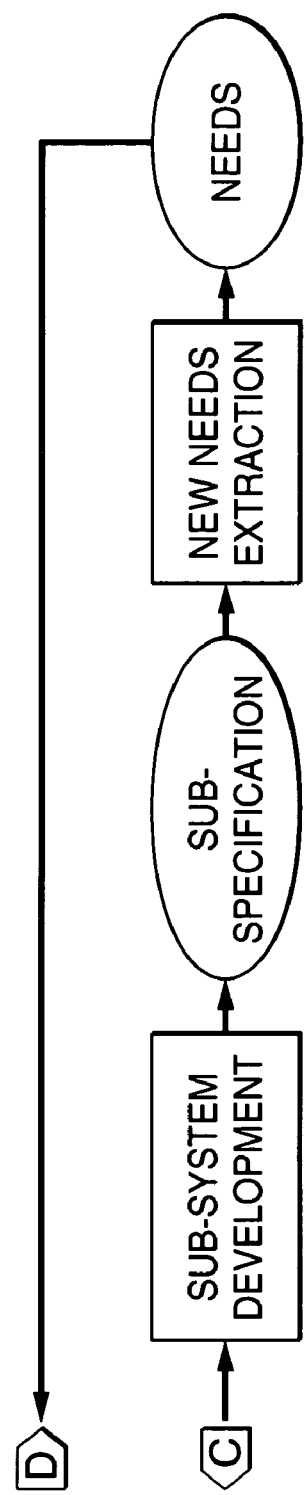

A case for accommodating the business process of the epistemological space "copier design" shown in FIG. 6 and the business process of the epistemological space "new technology development" shown in FIG. 11 will be described in accordance with the algorithm shown in FIG. 7.

Figure 7A:
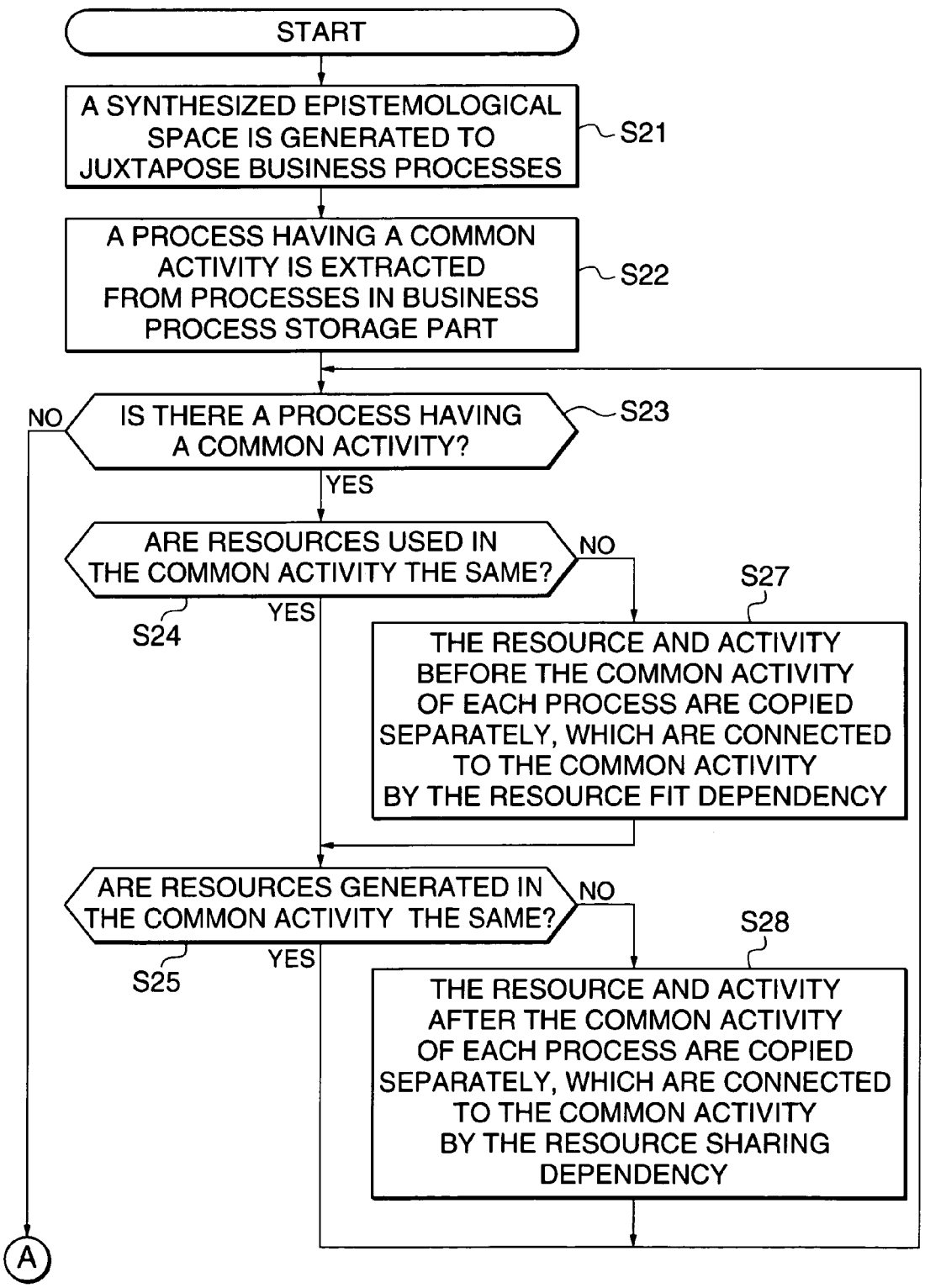
FIG. 7 is a flowchart of assistance in explaining business process synthesizing in a synthesized epistemological space and an accommodating activity extraction algorithm according to the embodiment.
Figure 7B:
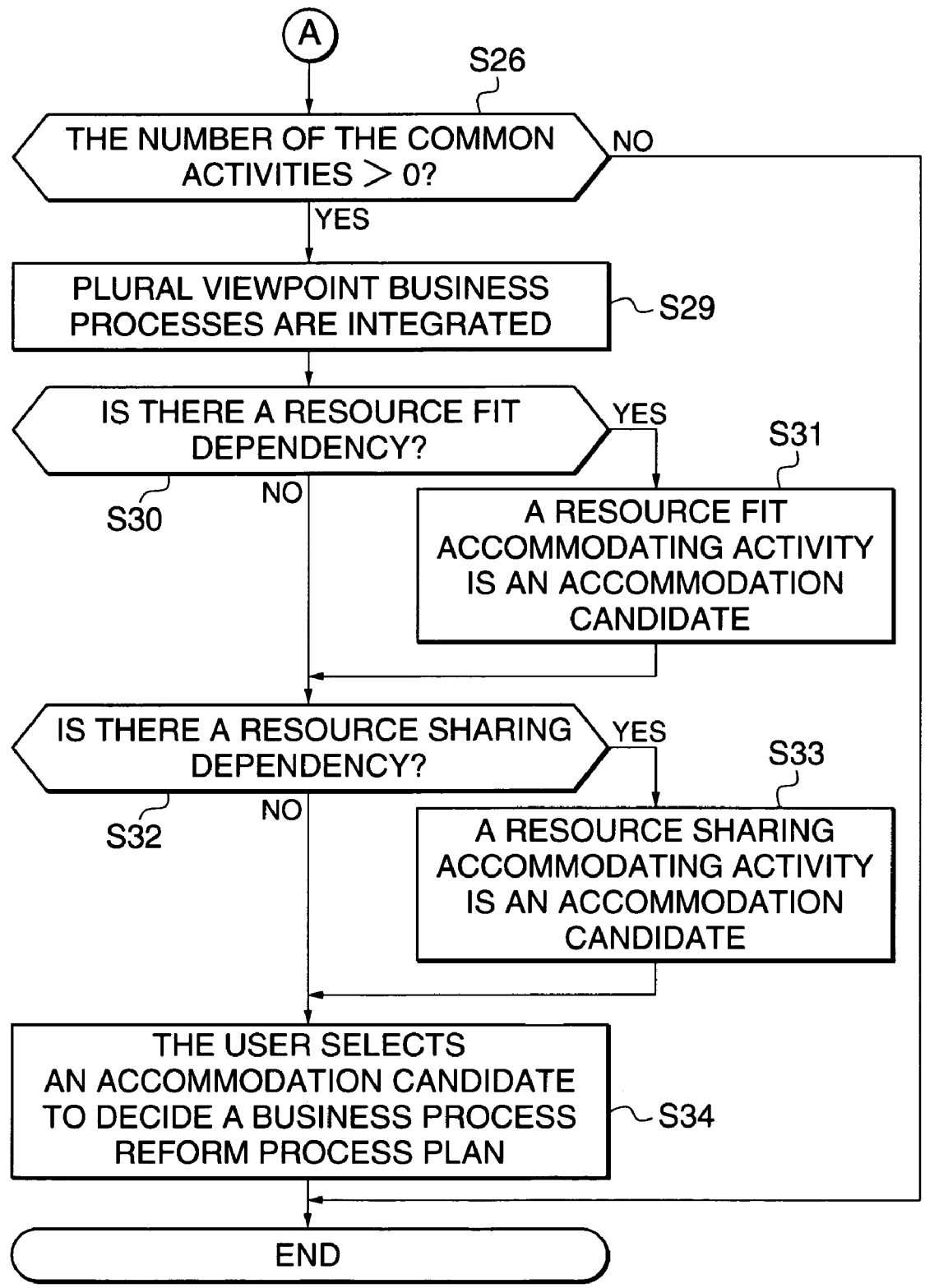

In FIG. 7, the epistemological space synthesizing part 110 generates a new epistemological space "new technology development+copier design" which synthesizes the epistemological space "new technology development" with the epistemological space "copier design", and then, the business processes are juxtaposed in the epistemological space (S21).

The activities defined in both the business processes are compared to extract a combinable common activity by the accommodated activity extraction part 112 (S22). The accommodated activity extraction part 112 uses the similar business process search rule so that the activity abstract-concrete (is-a) relation is within a relative in the second degree to extract a common activity. In the example of the business process of "copier design" and the business process of the epistemological space "new technology development", the activity "sub-system development" and the activity "partial design" are in a relative relation, which are then extracted as a common activity. In this case, which of the activity "sub-system development" and the activity "partial designs" is a common activity may be decided by selection according to the user's preference or selection of an activity as a detailed activity.

When there is a process having a common activity (S23), whether a resource used in the common activity is a combinable resource is extracted by the common resource extraction part 113 (S24).

The common resource extraction part 113, like common activity extraction, may use the resource abstract-concrete (is-a) relation and the resource Whole-part (has-a) relation shown in FIG. 9 to define the range of common resource extraction by the similar business process search rule, whereby the common resource may be extracted in accordance with the rule.

In the example of the business process of the epistemological space "copier design" and the business process of the epistemological space "new technology development", the resource "new technology system specification" of the (common) activity "sub-system development" and the resource "system specification" of the (common) activity "partial design" are in an abstract-concrete relation as shown in FIG. 14, which can be extracted as the common resource.

Similarly, whether a resource produced by the common activity is the common activity is extracted by the common resource extraction part 113 (S25). In this case, the resource "sub-specification" of the (common) activity "sub-system development" and the resource "sub-drawing" of the (common) activity "partial design" are in a resource whole-part (has-a) relation as shown in FIG. 9, which can be extracted as the common resource. Which of plural resources identified as the common resource is represented as the common resource may be decided by selection according to the user's preference or selection of the detailed resource, although the present invention is not affected like the common activity.

Until no more common activity cannot be extracted, the (backward) activity which produces the common production resource and the (forward) activity which uses the common use resource are extracted while comparing the juxtaposed business processes (S23, S24 and S25).

When no common activity can be extracted at all through the steps, the routine is terminated (S26).

Otherwise, the common activity and resource are combined to create a combined business process which synthesizes plural epistemological spaces (S27 and S28).

Thereafter, plural viewpoint business processes are integrated (S29). When there is a connection relation representing the resource dependency, a resource fit accommodation activity is an accommodation candidate (S30 and S31). When there is a resource sharing dependency, a resource sharing accommodation activity is an accommodation candidate (S32 and S33). The user selects an accommodation candidate to decide an execution process plan of the business process reform (S34).

This point will be further described.

Figure 6:
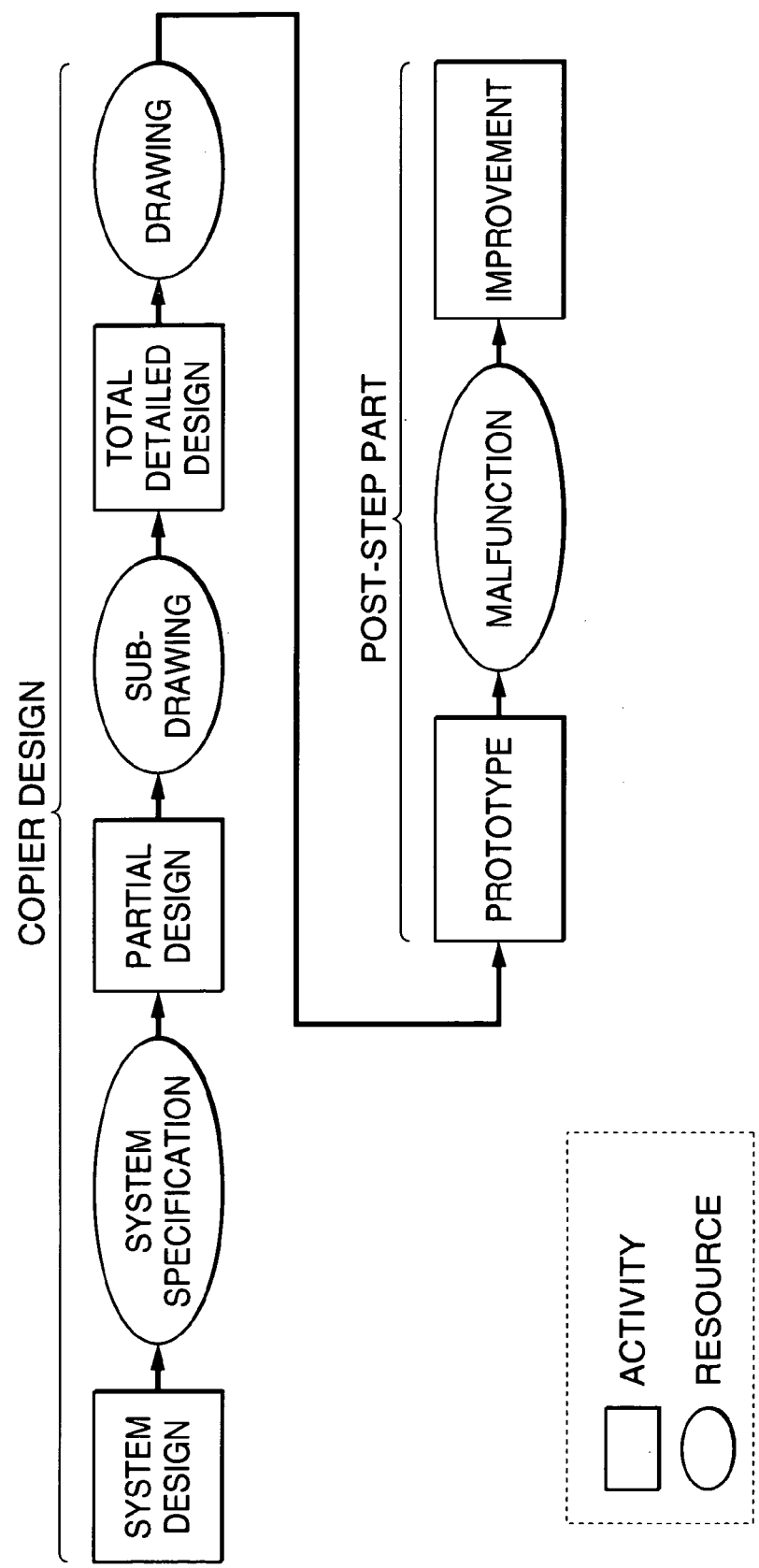
FIG. 6 is a diagram of assistance in explaining an example of a business process of epistemological space "copier design process" according to the embodiment.
Figures 12A, 12B:
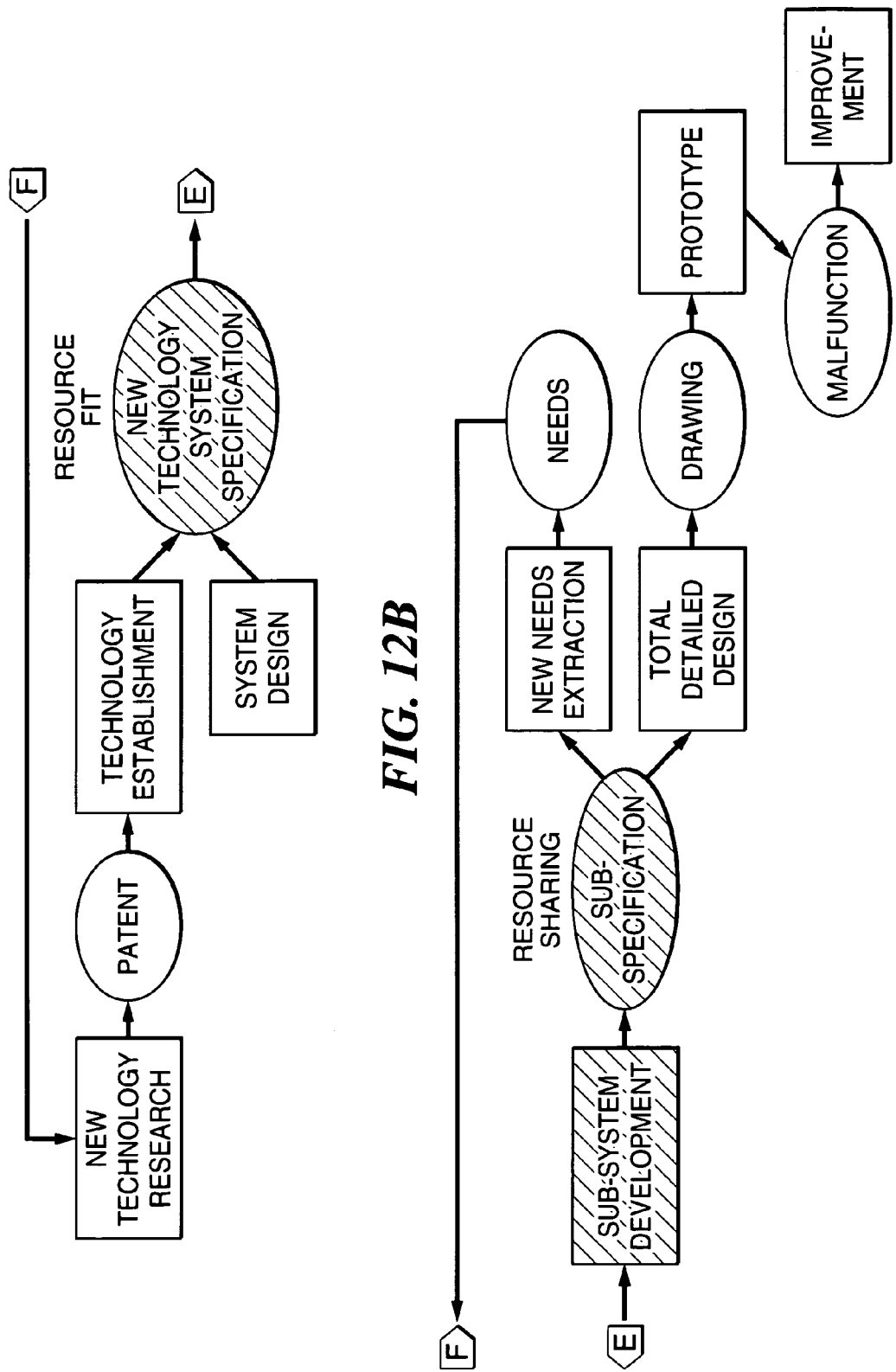
FIG. 12 is a diagram of assistance in explaining an example of a combined business process of synthesized epistemological space "new technology development+ copier design" according to the embodiment.

FIG. 12 shows business processes integrated in the synthesized epistemological space "new technology development+copier design" shown in FIG. 6.

Figure 16A:
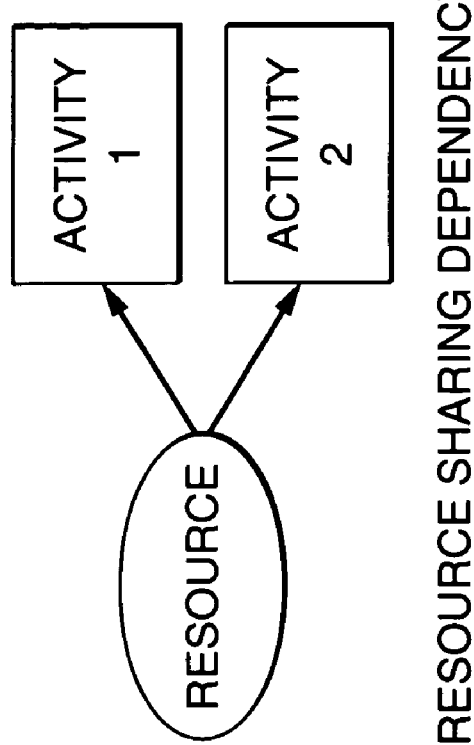
FIG. 16 is a diagram of assistance in explaining a resource fit dependency and a resource sharing dependency according to the embodiment.
Figure 16B:
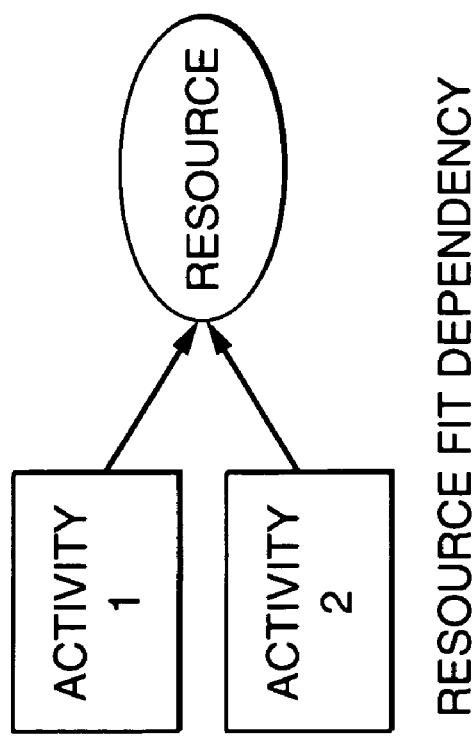

After integrating the processes, a connection relation having the dependency shown in FIG. 16 is extracted, to which the corresponding accommodation knowledge is applied. The resource fit dependency is a relation which produces the same resource from plural activities. The resource sharing dependency is a case which uses the same resource by plural activities. In the integrated business process shown in FIG. 12, there exist a connection relation having a resource fit dependency to the connection relation related to the resource "new technology system specification" and a resource sharing dependency to the connection relation related to the resource "sub-specification".

As shown in FIG. 10, accommodation knowledge applicable to the dependencies from the accommodating activities which can be searched from the basic accommodating activity of the global epistemological space is presented to the user, and the user selects it. In the resource fit dependency, the accommodating activity below the activity "resource fit accommodation" is a selection candidate. In the resource sharing dependency, the accommodating activity below the activity "resource sharing accommodation" is a selection candidate.

A rule to change the activity-resource relation described into the dependency targeted for each of the accommodating activities may be defined previously. The user may select an accommodation activity to automatically arrange the accommodating activity in the integrated business process. The user may simply select an accommodating activity to manually arrange it in the integrated process.

The user observes the result in which the accommodating activity is arranged in the integrated process to judge the execution possibility. When judging there is an execution possibility, the execution process plan which accommodates the business processes of plural different epistemological spaces is provided. When judging there is no execution possibility, the user selects another accommodating activity which may be alternative by any one of the methods described in the present invention or acquires and selects new accommodation knowledge using the above-mentioned accommodation knowledge extraction method after changing part of the activity in the epistemological space.

In the example of the combined business process in the synthesized epistemological space "new technology development+copier design" of FIG. 12 which integrates the business process of "copier design" with the business process of the epistemological space "new technology development", the user can select "cooperative activity" as the resource fit accommodation knowledge, and concretize the cooperative activity to add the activity "developer participation in system development" into the combined business process of the synthesized epistemological space "new technology development+copier design". Similarly, as the resource sharing accommodation knowledge, "replacement of a pre-step activity with a post-step activity" accommodation activity can be selected to omit an activity "needs extraction" of the epistemological space "new technology development" for accommodation so as to produce a resource "needs" by the activity "total detailed design."

A second method is a method for reusing accommodation knowledge previously used in the similar synthesized epistemological space.

The user searches as a candidate of the registered synthesized epistemological space which includes epistemological spaces similar to targeted epistemological spaces, using the business process search rule.

For example, in the business process search rule, the user defines a rule "to search a synthesized epistemological space having as a component a epistemological space in a parent-child relation or a bother relation with a epistemological space to which a business process to be accommodated belongs." Using the rule, the user can select the synthesized epistemological space "new technology development+design" including the epistemological space "design" which is a epistemological space above the machine design and the accommodable epistemological space "new technology development." The user can select and reuse the accommodating activity "developer transfer" used there as an accommodating activity.

The search range may be limited to accommodation knowledge applied in certain activities or activities and resources using the business process template. FIG. 6 is an example in which the activity-resource relation in the epistemological space "copier design" is used as the business process template to define the business process by the process definition part. The resource produced and used between activities is defined and the activity-resource connection relation is defined in detail. The activity "basic design" in a typical process is disintegrated into the activity "partial design" and the activity "total detailed design." In the synthesized epistemological space "design+production preparation", it is possible to search the activity "basic design" of the epistemological space "design" and the accommodating activity "integrated quality inspection" previously accommodated by the activity "prototype" of the epistemological space "production preparation." Using the searched accommodating activity "integrated quality inspection," the user can invent as an accommodating activity "virtual quality inspection" as the concrete accommodating activity of the "integrated quality inspection" in which a design person in charge and a production preparation person in charge jointly perform quality inspection before the actual prototype based on a design drawing to the "total detailed design" as the detailed activity of the typical activity "basic design" in the business process template in the epistemological space "copier design."

As a new epistemological space in the same form as FIG. 3, a typical process in the epistemological space "copier design" is the business process template, which can be added to the business process information storage part depending on the user's preference.

As is used in the first method, the business process search rule may be used to limit or extend the activity and resource search range so as to search the corresponding accommodating activity from the activity-resource dependency. Even when the accommodation knowledge of the "developer transfer" is not registered into the business process information storage part, a combined business process may be generated manually or automatically. Then, the user may insert the accommodating activity into part of it to newly register it as the executable process plan into the business process information storage part.

Figure 8:
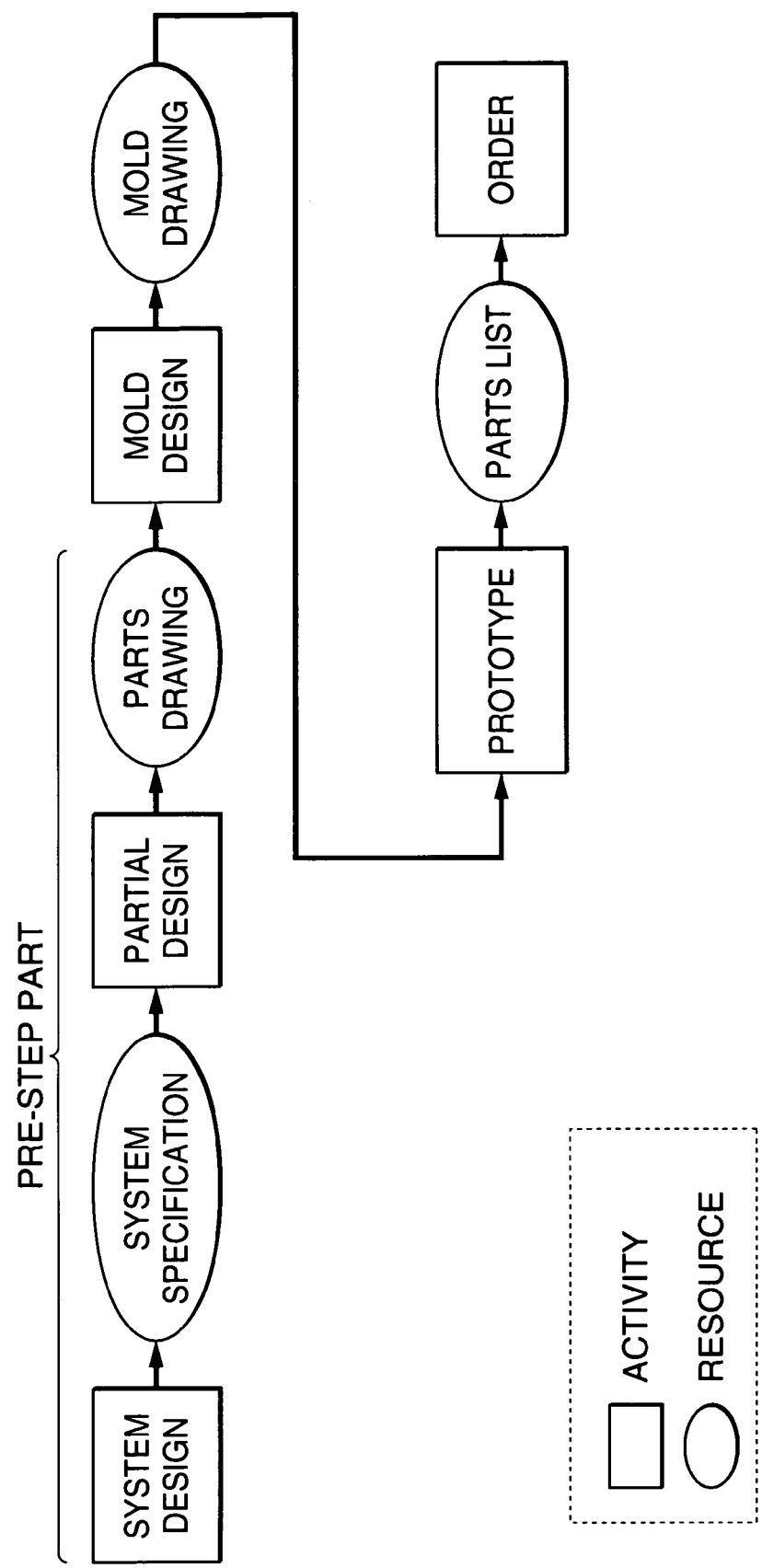
FIG. 8 is a diagram of assistance in explaining an example of a business process of epistemological space "production preparation" according to the embodiment.

There is another method in which a business process in an epistemological space including pre- and post-steps is stored into the business process storage information; the accommodated part is extracted; and an applicable accommodating activity is searched and selected. For example, in FIG. 6, for the business process after the activity "prototype" of the epistemological space "copier design," there is described a business process as the epistemological space "copier design" related to the epistemological space "production preparation" of the post-step. Similarly, in FIG. 8, the activity "system design" to the resource "parts drawing" of the epistemological space "production preparation (copier design)" is a business process related to the pre-step "copier design". The resource "sub-drawing" of the epistemological space "copier design" of FIG. 6 is the resource "parts drawing" used in the activity "mold design" for the epistemological space "production preparation". The activity "partial design" of the epistemological space "copier design" of FIG. 6 is the activity "parts design" as a parts design activity used in mold design for the epistemological space "production preparation". In such a manner, a relation to use a part in which the same activity is defined by different names or part of the resource (partial resource) is searched and identified from the resource inclusion relation taxonomy and the activity abstract-concrete (is-a) relation taxonomy shown in FIG. 9 to search and apply knowledge accommodated there. For example, in FIG. 9, there is "parts drawing" as a partial resource of the resource "sub-drawing." It is possible to suggest accommodation possibility by studying, e.g., interest between activities which produce the resources therefrom. The accommodating result can be defined as accommodation knowledge from the pre- and post-step business process, as shown in FIG. 5.

The newly added accommodation knowledge can be added to the business process information storage part together with connection information, as shown in FIG. 19. The user may add all accommodation knowledge acquired by the above method or may selectively add it.

Descriptions of the terms such as "epistemological space," "activity," "resource," "accommodating activity" and "dependency" are omitted in the drawings for simplification. The description may be added to the business process information storage part to use the description and full-text search for search.

The present invention can easily accommodate in a short time a process that participants in different situations define in plural epistemological spaces and can efficiently search an executable business process. In addition, the user can learn an activity as the base of accommodation and previously executed business process accommodation, and can efficiently learn by himself/herself a business process reform or improvement method. With accommodation knowledge which is at the core for coordination, knowledge management related to a business process is permitted.

The entire disclosure of Japanese Patent Application No. 2001-320480 filed on Oct. 18, 2001 including specification, claims, drawings and abstract is incorporated herein by reference in its entirety.

What is claimed is:

1. A business process accommodating device which accommodates a plurality of business processes respectively defined so that a plurality of activities have a dependency through resources, comprising:

a business information storage unit that stores epistemological spaces for business processes;

a definition unit that defines in each of the epistemological spaces each of the business processes to be accommodated;

an epistemological space synthesizing unit that synthesizes the epistemological spaces;

an accommodated activity extraction unit that extracts in them synthesized epistemological space a combinable activity from activities defined in the business process to be accommodated;

a common resource extraction unit that extracts a combinable resource in the business process to be accommodated;

a pre- and post-activity extraction unit that extracts activities executed before and after the extracted activity of each of the business processes;

a combined business process generation unit that combines the business processes to be accommodated; and an accommodating activity extraction selection unit that extracts an accommodating activity from the combined business process, wherein the business process information storage unit stores accommodation knowledge, the accommodating activity extraction selection unit extracts as the accommodating activity part a resource-activity dependency, extracts accommodation knowledge corresponding to the dependency from the business process information storage unit, an abstract-concrete relation between activities stored into the business process information is used to define a rule to stipulate a similar activity, and the accommodated activity extraction unit extracts as a combinable accommodated activity an activity matched with the rule from the business process information storage unit.

2. The business process accommodating device according to claim 1, wherein based on the extracted accommodation knowledge, a combined business process is edited, and the edited business process can be stored into the business process information storage unit together with the accommodating activity.

3. The business process accommodating device according to claim 1, wherein a previously accommodated accommodating activity can be searched from the synthesized epistemological space.

4. The business process accommodating device according to claim 3, wherein an abstract-concrete relation between epistemological spaces stored into the business process information is used to define a rule to stipulate a range for searching the synthesized epistemological space, thereby selecting a synthesized epistemological space matched with the rule.

5. The business process accommodating device according to claim 4, wherein an abstract-concrete relation between activities stored into the business process information is used to define a rule to stipulate a similar activity, and an activity matched with the rule is extracted as an accommodating activity from the business process information storage unit.

6. The business process accommodating device according to claim 1, wherein an accommodating activity can be searched using information defined in an epistemological space to which the business process to be accommodated belongs.

7. The business process accommodating device according to claim 1, wherein an accommodating activity can be searched using activity information included in process information defined in an epistemological space to which the business process to be accommodated belongs.

8. The business process accommodating device according to claim 1, wherein an accommodating activity is searched using a typical business process pattern activity defined in an epistemological space to which the business process to be accommodated belongs.

9. The business process accommodating device according to claim 1, wherein an abstract-concrete relation between resources stored into the business process information is used to define a rule to stipulate a similar resource, and the common resource extraction unit extracts as a combinable common resource a resource matched with the rule from the business process information storage unit.

10. The business process accommodating device according to claim 1, wherein a whole-part relation between resources stored into the business process information is used to define a rule to stipulate a similar resource, and the common resource extraction unit extracts as a combinable common resource a resource matched with the rule from the business process information storage unit.

11. The business process accommodating device according to claim 1, wherein the business process information storage unit defines a process including either of pre- and post-steps in addition to business in which a participant is directly involved.

* * * * *